(12) United States Patent
Jeong et al.

(10) Patent No.: US 12,375,528 B2
(45) Date of Patent: Jul. 29, 2025

(54) METHOD AND APPARATUS FOR SECURITY MANAGEMENT BASED ON I2NSF ANALYTICS INTERFACE YANG DATA MODEL

(71) Applicant: RESEARCH & BUSINESS FOUNDATION SUNGKYUNKWAN UNIVERSITY, Suwon-si (KR)

(72) Inventors: Jaehoon Jeong, Busan (KR); Patrick Lingga, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 228 days.

(21) Appl. No.: 17/896,553

(22) Filed: Aug. 26, 2022

(65) Prior Publication Data

US 2023/0103979 A1  Apr. 6, 2023

(30) Foreign Application Priority Data

Aug. 27, 2021 (KR) .................. 10-2021-0114112
Apr. 28, 2022 (KR) .................. 10-2022-0052915
Jul. 25, 2022 (KR) .................. 10-2022-0092087

(51) Int. Cl.
*G06F 21/00* (2013.01)
*H04L 9/40* (2022.01)

(52) U.S. Cl.
CPC .................. *H04L 63/20* (2013.01)

(58) Field of Classification Search
CPC ... H04L 63/20; H04L 63/1408; H04L 41/145; G06N 20/00
See application file for complete search history.

(56) References Cited

U.S. PATENT DOCUMENTS

2013/0179936 A1* 7/2013 Choi .................. G06F 21/57
726/1
2017/0078247 A1* 3/2017 Woolward .......... H04L 63/0236
(Continued)

FOREIGN PATENT DOCUMENTS

KR  10-2020-0003738 A  1/2020
KR  10-2021-0012902 A  2/2021
(Continued)

OTHER PUBLICATIONS

Chung, Chaehong, et al, "Intent-Based Security System for Cloud Security Services." Proceedings of the Korean Institute of Communication Sciences Conference (2020): 464-465.
(Continued)

*Primary Examiner* — Michael M Lee
(74) *Attorney, Agent, or Firm* — NSIP Law

(57) ABSTRACT

The present disclosure relates to a data model for an analytics interface between an Interface to Network Security Functions (I2NSF) analyzer and a security controller in a security management system. A method of performing a security management by the I2NSF analyzer includes receiving monitoring data from at least one network security function (NSF) providing a security service, analyzing the received monitoring data to generate a new security policy or feedback information, and providing the generated new security policy or feedback information to the security controller.

16 Claims, 24 Drawing Sheets

(56) References Cited

U.S. PATENT DOCUMENTS

2019/0036968 A1* 1/2019 Sela .................... H04L 41/0813
2022/0188690 A1* 6/2022 Rawat .................... G06V 10/82

FOREIGN PATENT DOCUMENTS

KR  10-2021-0012955 A     2/2021
WO  WO-2019088671 A1 *   5/2019  ............. H04L 29/06

OTHER PUBLICATIONS

Korean Office Action issued on Apr. 23, 2024, in counterpart Korean Patent Application No. 10-2022-0107819 (4 pages in English, 4 pages in Korean).
Korean Office Action Issued on Nov. 26, 2024, in Counterpart Korean Patent Application No. 10-2022-0107819 (6 Pages in English, 6 Pages in Korean).

\* cited by examiner

FIG. 7

```
augment /i2nsfnfi:i2nsf-security-policy:
  +--rw nsf-name?   union
  +--rw problem
     +--rw (attack-detection)?
        +--:(ddos-detected)
        |  +--rw ddos-detected
        |     +--rw attack-src-ip*     inet:ip-address-no-zone
        |     +--rw attack-dst-ip*     inet:ip-address-no-zone
        |     +--rw attack-src-port*   inet:port-number
        |     +--rw attack-dst-port*   inet:port-number
        +--:(virus-detected)
        |  +--rw virus-detected
        |     +--rw virus-name?   string
        |     +--rw virus-type?   identityref
        |     +--rw host?         union
        |     +--rw file-type?    string
        |     +--rw file-name?    string
        |     +--rw os?           string
        +--:(intrusion-detected)
        |  +--rw intrusion-detected
        |     +--rw protocol?     identityref
        |     +--rw app?          identityref
        |     +--rw attack-type?  identityref
        +--:(web-attack-detected)
        |  +--rw web-attack-detected
        |     +--rw attack-type?    identityref
        |     +--rw req-method?     identityref
        |     +--rw req-uri?        string
        |     +--rw req-user-agent? string
        |     +--rw cookies?        string
        |     +--rw req-host?       string
        |     +--rw response-code?  string
        +--:(voip-vocn-detected)
           +--rw voip-vocn-detected
              +--rw source-voice-id*      string
              +--rw destination-voice-id* string
              +--rw user-agent*           string
```

FIG. 10

```
module: ietf-i2nsf-analytics-interface
  +--rw i2nsf-feedback-information* [nsf-name time]
     +--rw nsf-name      union
     +--rw time          yang:date-and-time
     +--rw language?     string
     +--rw problem
     |  +--rw (alarm-type)?
     |     +--:(memory-alarm)
     |     |  +--rw memory-alarm
     |     |     +--rw usage?       uint8
     |     |     +--rw message?     string
     |     |     +--rw duration?    uint32
     |     +--:(cpu-alarm)
     |     |  +--rw cpu-alarm
     |     |     +--rw usage?       uint8
     |     |     +--rw message?     string
     |     |     +--rw duration?    uint32
     |     +--:(disk-alarm)
     |     |  +--rw disk-alarm
     |     |     +--rw disk-id?     string
     |     |     +--rw usage?       uint8
     |     |     +--rw message?     string
     |     |     +--rw duration?    uint32
     |     +--:(hardware-alarm)
     |     |  +--rw hardware-alarm
     |     |     +--rw component-name?   string
     |     |     +--rw message?          string
     |     |     +--rw duration?         uint32
     |     +--:(interface-alarm)
     |        +--rw interface-alarm
     |           +--rw interface-id?     string
     |           +--rw interface-state?  enumeration
     |           +--rw message?          string
     |           +--rw duration?         uint32
     +--rw solution*     string
```

FIG. 11A

```
<CODE BEGINS> file "ietf-i2nsf-analytics-interface@2022-07-25.yang"
  module ietf-i2nsf-analytics-interface {
    yang-version 1.1;
    namespace
      "urn:ietf:params:xml:ns:yang:ietf-i2nsf-analytics-interface";
    prefix
      i2nsfai;

import ietf-inet-types{
    prefix inet;
    reference "RFC 6991";
  } import ietf-yang-types{
    prefix yang;
    reference "RFC 6991";
  } import ietf-i2nsf-nsf-facing-interface {
    prefix i2nsfnfi;
    reference
      "Section 4 of draft-ietf-i2nsf-nsf-facing-interface-dm-29";
  }
```

FIG. 11B

```
import ietf-i2nsf-monitoring-interface {
  prefix i2nsfmi;
  reference
    "Section 8 of draft-ietf-i2nsf-nsf-monitoring-data-model-20";
} organization
  "IETF I2NSF (Interface to Network Security Functions)
  Working Group";

contact
  "WG Web: <http://tools.ietf.org/wg/i2nsf>
  WG List: <mailto:i2nsf@ietf.org>

Editor: Patrick Lingga
  <mailto:patricklink@skku.edu>

Editor: Jaehoon Paul Jeong
  <mailto:pauljeong@skku.edu>";

description
  "This module is a YANG module for Analytics Interface.

The key words 'MUST', 'MUST NOT', 'REQUIRED', 'SHALL',
  'SHALL NOT', 'SHOULD', 'SHOULD NOT', 'RECOMMENDED',
  'NOT RECOMMENDED', 'MAY', and 'OPTIONAL' in this
  document are to be interpreted as described in BCP 14
  (RFC 2119) (RFC 8174) when, and only when, they appear
  in all capitals, as shown here.

Copyright (c) 2022 IETF Trust and the persons identified as
  authors of the code.  All rights reserved.

Redistribution and use in source and binary forms, with or
  without modification, is permitted pursuant to, and subject
  to the license terms contained in, the Revised BSD License
  set forth in Section 4.c of the IETF Trust's
  Legal Provisions Relating to IETF Documents
  (https://trustee.ietf.org/license-info).

This version of this YANG module is part of RFC XXXX
  (https://www.rfc-editor.org/info/rfcXXXX); see the RFC itself
  for full legal notices.";

// RFC Ed.: replace XXXX with an actual RFC number and remove
// this note.

revision "2022-07-25" {
```

FIG. 11C

```
description "Initial revision.";
reference
  "RFC XXXX: I2NSF Analytics Interface YANG Data Model";

// RFC Ed.: replace XXXX with an actual RFC number and remove
// this note.
} augment "/i2nsfnfi:i2nsf-security-policy" {
  description
  "Augment the NSF-Facing Interface Data Model for the policy
   reconfiguration";
  leaf nsf-name {
    type union {
      type string;
      type inet:ip-address;
    }
    description
      "The name or IP address (IPv4 or IPv6) of the NSF to be
       configured. If the given nsf-name is not IP address, the
       name can be an arbitrary string including FQDN (Fully
       Qualified Domain Name).";
  } container problem {
    description
      "Problem: The issue that is emitted by an NSF via the
       I2NSF Monitoring Interface such as DDoS detection, Virus
       detection, Intrusion detection, Web-attack detection, and
       VoIP/VoCN violation detection.";
    choice attack-detection {
      description
        "The detected attack type";
      case ddos-detected {
        container ddos-detected {
          leaf-list attack-src-ip {
            type inet:ip-address-no-zone;
            description
              "The source IPv4 or IPv6 addresses of attack
               traffic. It can hold multiple IPv4 or IPv6
               addresses. Note that all IP addresses should not be
               included, but only limited IP addresses are included
               to conserve the server resources. The listed
               attacking IP addresses can be an arbitrary sampling
               of the 'top talkers', i.e., the attackers that send
               the highest amount of traffic.";
          }
```

FIG. 11D

```
    leaf-list attack-dst-ip {
      type inet:ip-address-no-zone;
      description
        "The destination IPv4 or IPv6 addresses of attack
         traffic. It can hold multiple IPv4 or IPv6
         addresses.";
    }
    leaf-list attack-src-port {
      type inet:port-number;
      description
        "The transport-layer source ports of the DDoS attack.
         Note that not all ports will have been seen on all
         the corresponding source IP addresses.";
    }
    leaf-list attack-dst-port {
      type inet:port-number;
      description
        "The transport-layer destination ports of the DDoS
         attack. Note that not all ports will have been seen
         on all the corresponding destination IP addresses.";
    }
    description
      "A container for DDoS Attack";
  }
  description
    "A DDoS Attack is detected";
}
case virus-detected {
  container virus-detected {
    leaf virus-name {
      type string;
      description
        "The name of the detected virus";
    }
    leaf virus-type {
      type identityref {
        base i2nsfmi:virus-type;
      }
      description
        "The virus type of the detected virus";
    }
    leaf host {
      type union {
        type string;
        type inet:ip-address-no-zone;
      }
      description
        "The name or IP address of the host/device. This is
```

FIG. 11E

```
          used to identify the host/device that is infected by
          the virus. If the given name is not an IP address,
          the name can be an arbitrary string including a FQDN
          (Fully Qualified Domain Name). The name MUST be
          unique in the scope of management domain for
          identifying the device that has been infected with
          a virus.";
        }
        leaf file-type {
          type string;
          description
            "The type of a file (indicated by the file's suffix,
            e.g., .exe) where virus code is found (if
            applicable).";
        }
        leaf file-name {
          type string;
          description
            "The name of file virus code is found in (if
            applicable).";
        }
        leaf os {
          type string;
          description
            "The operating system of the device.";
        }
        description
          "A Virus Attack is detected";
      }
      description
        "A virus is detected";
    }
    case intrusion-detected {
      container intrusion-detected {
        leaf protocol {
          type identityref {
            base i2nsfmi:transport-protocol;
          }
          description
            "The transport protocol type for
            nsf-detection-intrusion notification";
        }
        leaf app {
          type identityref {
            base i2nsfmi:application-protocol;
          }
          description
            "The employed application layer protocol";
```

FIG. 11F

```
    }
    leaf attack-type {
      type identityref {
        base i2nsfmi:intrusion-attack-type;
      }
      description
        "The sub attack type for intrusion attack";
    }
    description
      "An intrusion is detected";
  }
}
case web-attack-detected {
  container web-attack-detected {
    leaf attack-type {
      type identityref {
        base i2nsfmi:web-attack-type;
      }
      description
        "Concrete web attack type, e.g., SQL injection,
         command injection, XSS, and CSRF.";
    }
    leaf req-method {
      type identityref {
        base i2nsfmi:req-method;
      }
      description
        "The HTTP request method, e.g., PUT or GET.";
      reference
        "draft-ietf-httpbis-semantics-19: HTTP Semantics -
         Request Methods";
    }
    leaf req-uri {
      type string;
      description
        "The Requested URI";
    }
    leaf req-user-agent {
      type string;
      description
        "The request user agent";
    }
    leaf cookies {
      type string;
      description
        "The HTTP Cookies header field of the request from
         the user agent. The cookie information needs to be
         kept confidential and is NOT RECOMMENDED to be
```

FIG. 11G

```
        included in the monitoring data unless the
        information is absolutely necessary to help to
        enhance the security of the network.";
      reference
        "RFC 6265: HTTP State Management Mechanism - Cookie";
    }
    leaf req-host {
      type string;
      description
        "The domain name of the requested host";
    }
    leaf response-code {
      type string;
      description
        "The HTTP Response code";
      reference
        "IANA Website: Hypertext Transfer Protocol (HTTP)
         Status Code Registry";
    }
    description
      "A web attack is detected";
  }
  description
    "A web attack is detected";
}
case voip-vocn-detected {
  container voip-vocn-detected {
    leaf-list source-voice-id {
      type string;
      description
        "The detected source voice ID for Voice over Internet
         Protocol (VoIP) and Voice over Cellular Network
         (VoCN) that violates the security policy.";
    }
    leaf-list destination-voice-id {
      type string;
      description
        "The detected destination voice ID for Voice over
         Internet Protocol (VoIP) and Voice over Cellular
         Network (VoCN) that violates the security policy.";
    }
    leaf-list user-agent {
      type string;
      description
        "The detected user-agent for VoIP and VoCN that
         violates the security policy.";
    }
    description
```

FIG. 11H

```
          "A violation of VoIP/VoCN is detected";
        }
        description
          "A violation of VoIP/VoCN is detected";
      }
    }
  }
} list i2nsf-feedback-information {
  key "nsf-name time";

description
    "Feedback information is information about problem(s) of an
     NSF for a security service such as system resource over-usage
     or malfunction. ";

leaf nsf-name {
    type union {
      type string;
      type inet:ip-address;
    }
    description
      "The name or IP address (IPv4 or IPv6) of the NSF to be
       configured. If the given nsf-name is not IP address, the
       name can be an arbitrary string including FQDN (Fully
       Qualified Domain Name).";
  } leaf time {
    type yang:date-and-time;
    description
      "The time of the feedback information delivered";
  } leaf language {
    type string {
      pattern '(([A-Za-z]{2,3}(-[A-Za-z]{3}(-[A-Za-z]{3})'
            + '{0,2})?|[A-Za-z]{4}|[A-Za-z]{5,8})(-[A-Za-z]{4})?'
            + '(-([A-Za-z]{2}|[0-9]{3}))?(-([A-Za-z0-9]{5,8}'
            + '|([0-9][A-Za-z0-9]{3})))*(-[0-9A-WY-Za-wy-z]'
            + '(-([A-Za-z0-9]{2,8}))+)*(-[Xx](-([A-Za-z0-9]'
            + '{1,8}))+)?|[Xx](-([A-Za-z0-9]{1,8}))+|'
            + '(([Ee][Nn]-[Gg][Bb]-[Oo][Ee][Dd]|[Ii]-'
            + '[Aa][Mm][Ii]|[Ii]-[Bb][Nn][Nn]|[Ii]-'
            + '[Dd][Ee][Ff][Aa][Uu][Ll][Tt]|[Ii]-'
            + '[Ee][Nn][Oo][Cc][Hh][Ii][Aa][Nn]'
            + '|[Ii]-[Hh][Aa][Kk]|'
```

FIG. 11I

```
          + '[Ii]-[Kk][Ll][Ii][Nn][Gg][Oo][Nn]|'
          + '[Ii]-[Ll][Uu][Xx]|[Ii]-[Mm][Ii][Nn][Gg][Oo]|'
          + '[Ii]-[Nn][Aa][Vv][Aa][Jj][Oo]|[Ii]-[Pp][Ww][Nn]|'
          + '[Ii]-[Tt][Aa][Oo]|[Ii]-[Tt][Aa][Yy]|'
          + '[Ii]-[Tt][Ss][Uu]|[Ss][Gg][Nn]-[Bb][Ee]-[Ff][Rr]|'
          + '[Ss][Gg][Nn]-[Bb][Ee]-[Nn][Ll]|[Ss][Gg][Nn]-'
          + '[Cc][Hh]-[Dd][Ee])|([Aa][Rr][Tt]-'
          + '[Ll][Oo][Jj][Bb][Aa][Nn]|[Cc][Ee][Ll]-'
          + '[Gg][Aa][Uu][Ll][Ii][Ss][Hh]|'
          + '[Nn][Oo]-[Bb][Oo][Kk]|[Nn][Oo]-'
          + '[Nn][Yy][Nn]|[Zz][Hh]-[Gg][Uu][Oo][Yy][Uu]|'
          + '[Zz][Hh]-[Hh][Aa][Kk][Kk][Aa]|[Zz][Hh]-'
          + '[Mm][Ii][Nn]|[Zz][Hh]-[Mm][Ii][Nn]-'
          + '[Nn][Aa][Nn]|[Zz][Hh]-[Xx][Ii][Aa][Nn][Gg])))';
      }
      default "en-US";
      description
        "The value in this field indicates the language tag
         used for all of the text in the module
         (i.e., 'leaf message' and 'leaf-list solution').

The attribute is encoded following the rules in Section 2.1
         in RFC 5646. The default language tag is 'en-US'";
      reference
        "RFC 5646: Tags for Identifying Languages";
    } container problem {
      description
        "The issue that is emitted by an NSF via the I2NSF Monitoring
         Interface. The problem for feedback information includes the
         system alarms, such as Memory alarm, CPU alarm, Disk alarm,
         Hardware alarm, and Interface alarm.";
      choice alarm-type {
        description
          "The detected alarm type";
        case memory-alarm {
          container memory-alarm {
            leaf usage {
              type uint8 {
                range "0..100";
              }
              units "percent";
              description
                "The average usage for the duration of the alarm.";
            }
            leaf message {
              type string;
```

FIG. 11J

```
      description
        "A message explaining the problem.";
    }
    leaf duration {
      type uint32;
      description
        "Specify the duration of the first alarm triggered
         until the feedback information is created.";
    }
    description
      "The container for memory-alarm";
  }
  description
    "The detected alarm type is memory-alarm";
}
case cpu-alarm {
  container cpu-alarm {
    leaf usage {
      type uint8 {
        range "0..100";
      }
      units "percent";
      description
        "The average usage for the duration of the alarm.";
    }
    leaf message {
      type string;
      description
        "A message explaining the problem.";
    }
    leaf duration {
      type uint32;
      description
        "Specify the duration of the first alarm triggered
         until the feedback information is created.";
    }
    description
      "The container for cpu-alarm";
  }
  description
    "The detected alarm type is cpu-alarm";
}
case disk-alarm {
  container disk-alarm {
    leaf disk-id {
      type string;
      description
        "The ID of the storage disk. It is a free form
```

FIG. 11K

```
          identifier to identify the storage disk.";
      }
      leaf usage {
        type uint8 {
          range "0..100";
        }
        units "percent";
        description
          "The average usage for the duration of the alarm.";
      }
      leaf message {
        type string;
        description
          "A message explaining the problem.";
      }
      leaf duration {
        type uint32;
        description
          "Specify the duration of the first alarm triggered
          until the feedback information is created.";
      }
      description
        "The container for disk-alarm";
    }
    description
      "The detected alarm type is disk-alarm";
  }
  case hardware-alarm {
    container hardware-alarm {
      leaf component-name {
        type string;
        description
          "The hardware component responsible for generating
          the message. Applicable for Hardware Failure
          Alarm.";
      }
      leaf message {
        type string;
        description
          "A message explaining the problem.";
      }
      leaf duration {
        type uint32;
        description
          "Specify the duration of the first alarm triggered
          until the feedback information is created.";
      }
      description
```

FIG. 11L

```
      "The container for hardware-alarm";
    }
    description
      "The detected alarm type is hardware-alarm";
  }
  case interface-alarm {
    container interface-alarm {
      leaf interface-id {
        type string;
        description
          "The interface ID responsible for generating
          the message.";
      }
      leaf interface-state {
        type enumeration {
          enum up {
            value 1;
            description
              "The interface state is up and not congested.
              The interface is ready to pass packets.";
          }
          enum down {
            value 2;
            description
              "The interface state is down, i.e., does not pass
              any packets.";
          }
          enum congested {
            value 3;
            description
              "The interface state is up but congested.";
          }
          enum testing {
            value 4;
            description
              "In some test mode.  No operational packets can
              be passed.";
          }
          enum unknown {
            value 5;
            description
              "Status cannot be determined for some reason.";
          }
          enum dormant {
            value 6;
            description
              "Waiting for some external event.";
          }
```

FIG. 11M

```
        enum not-present {
          value 7;
          description
            "Some component (typically hardware) is
            missing.";
        }
        enum lower-layer-down {
          value 8;
          description
            "Down due to state of lower-layer interface(s).";
        }
      }
      description
        "The state of the interface. Applicable for Network
        Interface Failure Alarm.";
      reference
        "RFC 8343: A YANG Data Model for Interface Management
        - Operational States";
    }
    leaf message {
      type string;
      description
        "A message explaining the problem.";
    }
    leaf duration {
      type uint32;
      description
        "Specify the duration of the first alarm triggered
        until the feedback information is created.";
    }
    description
      "The container for interface-alarm";
  }
  description
    "The detected alarm type is interface-alarm";
    }
   }
  } leaf-list solution {
    type string;
    description
      "A possible solution given as feedback is in the form of
      a free-form string (as a high-level instruction).";
  }
 }
}
<CODE ENDS>
```

FIG. 12

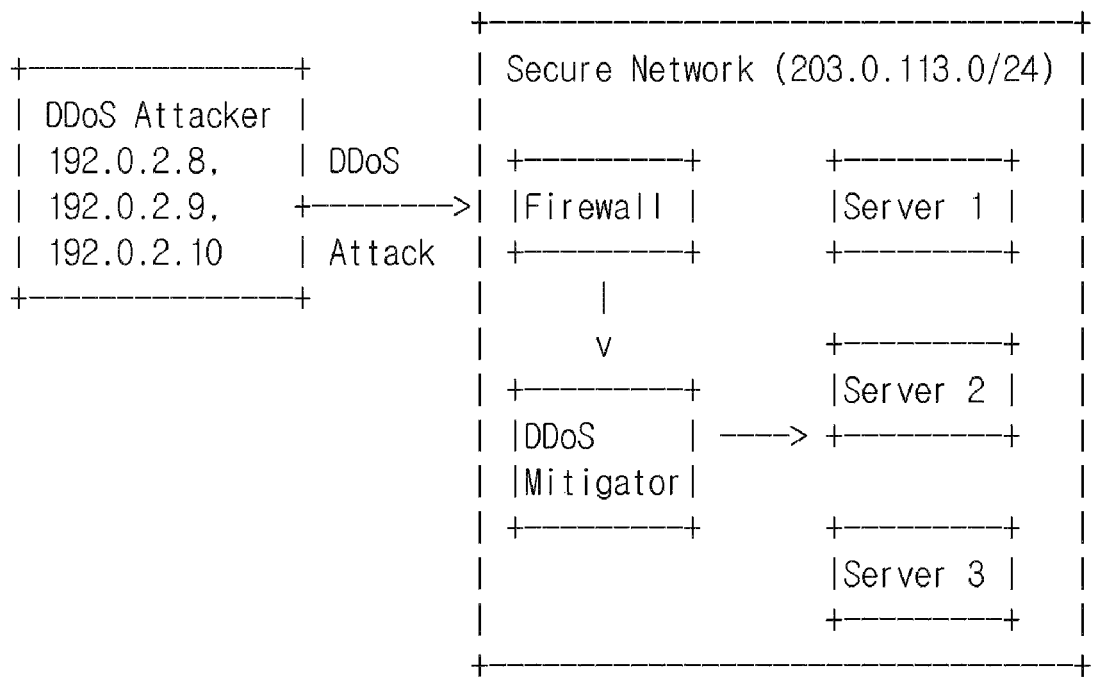

FIG. 13

```
<?xml version="1.0" encoding="UTF-8"?>
<notification
  xmlns="urn:ietf:params:xml:ns:netconf:notification:1.0">
  <eventTime>2021-08-27T09:00:01.00Z</eventTime>
  <i2nsf-nsf-event
    xmlns="urn:ietf:params:xml:ns:yang:ietf-i2nsf-monitoring-interface">
    <acquisition-method>subscription</acquisition-method>
    <emission-type>on-change</emission-type>
    <dampening-type>on-repetition</dampening-type>
    <i2nsf-nsf-detection-ddos>
      <attack-type>i2nsfmi:syn-flood</attack-type>
      <start-time>2021-08-27T09:00:00.00Z</start-time>
      <attack-src-ip>192.0.2.8</attack-src-ip>
      <attack-src-ip>192.0.2.9</attack-src-ip>
      <attack-src-ip>192.0.2.10</attack-src-ip>
      <attack-dst-ip>203.0.113.0/24</attack-dst-ip>
      <attack-rate>100</attack-rate>
      <message>A DDoS Attack is detected</message>
      <nsf-name>DDoS_mitigator</nsf-name>
    </i2nsf-nsf-detection-ddos>
  </i2nsf-nsf-event>
</notification>
```

FIG. 14

```xml
<?xml version="1.0" encoding="UTF-8" ?>
<i2nsf-security-policy
 xmlns="urn:ietf:params:xml:ns:yang:ietf-i2nsf-analytics-interface">
  <system-policy-name>
    feedback_policy_for_ddos_attack
  </system-policy-name>
  <rules>
    <rule-name>deny_ddos_attack</rule-name>
    <condition>
      <ipv4>
        <source-ipv4-range>
          <start>192.0.2.8</start>
          <end>192.0.2.10</end>
        <source-ipv4-range>
      </ipv4>
      <context>
        <time>
          <start-date-time>2021-08-27T09:00:00.00Z</start-date-time>
        </time>
      </context>
    </condition>
    <actions>
      <packet-action>
        <ingress-action>drop</ingress-action>
      </packet-action>
    </actions>
  </rules>
  <nsf-name>Firewall</nsf-name>
  <problem>
    <ddos-detected>
      <attack-src-ip>192.0.2.8</attack-src-ip>
      <attack-src-ip>192.0.2.9</attack-src-ip>
      <attack-src-ip>192.0.2.10</attack-src-ip>
      <attack-dst-ip>203.0.113.0/24</attack-dst-ip>
    </ddos-detected>
  </problem>
</i2nsf-security-policy>
```

FIG. 15

```xml
<?xml version="1.0" encoding="UTF-8"?>
<notification
 xmlns="urn:ietf:params:xml:ns:netconf:notification:1.0">
  <eventTime>2021-08-27T07:43:52.181088+00:00</eventTime>
  <i2nsf-event
    xmlns="urn:ietf:params:xml:ns:yang:ietf-i2nsf-monitoring-interface">
    <acquisition-method>subscription</acquisition-method>
    <emission-type>on-change</emission-type>
    <dampening-type>on-repetition</dampening-type>
    <language>en-US</language>
    <i2nsf-system-detection-alarm>
      <alarm-category>memory-alarm</alarm-category>
      <usage>91</usage>
      <threshold>90</threshold>
      <message>Memory Usage Exceeded the Threshold</message>
      <nsf-name>time_based_firewall</nsf-name>
      <severity>high</severity>
    </i2nsf-system-detection-alarm>
  </i2nsf-event>
</notification>
```

FIG. 16

```xml
<?xml version="1.0" encoding="UTF-8" ?>
<i2nsf-feedback-information
 xmlns="urn:ietf:params:xml:ns:yang:ietf-i2nsf-analytics-interface">
  <time>2021-08-27T08:43:52.000000+00:00</time>
  <nsf-name>Firewall</nsf-name>
  <language>en-US</language>
  <problem>
    <memory-alarm>
      <usage>95</usage>
      <message>Memory Usage Exceeded the Threshold</message>
      <duration>3600</duration>
    </memory-alarm>
  </problem>
  <solution>
    Add more memory capacity to the NSF
  </solution>
  <solution>
    Create a new NSF with the same security service
  </solution>
</i2nsf-feedback-information>
```

METHOD AND APPARATUS FOR SECURITY MANAGEMENT BASED ON I2NSF ANALYTICS INTERFACE YANG DATA MODEL

CROSS-REFERENCE TO RELATED APPLICATIONS

This application claims the benefit under 35 USC 119 (a) of Korean Patent Application Nos. 10-2021-0114112 filed on Aug. 27, 2021, 10-2022-0052915 filed on Apr. 28, 2022, and 10-2022-0092087 filed on Jul. 25, 2022, in the Korean Intellectual Property Office, the entire disclosures of which are incorporated herein by reference for all purposes.

TECHNICAL FIELD

The present disclosure relates to a data model, and more particularly to a technology of defining a YANG data model for an analytics interface between an Interface to Network Security Functions (I2NSF) analyzer and a security controller in a security management system and performing a security management based on the YANG data model.

BACKGROUND ART

Information can be quickly accessed regardless of geographical distance by connecting the network to the world. The Internet is essentially a large number of networks in which different levels of hierarchical structures are connected to each other.

The Internet is operated based on transport control protocol (TCP)/internet protocol (IP) published by the Internet Engineering Task Force (IETF), and the TCP/IP can be found in RFC 791 issued by the Request For Comments (RFC) 703 and the IETF.

DISCLOSURE

Technical Problem

An technical object of embodiments of the present disclosure is to solve problems that have not been presented by a data model suitable for an analytics interface between an Interface to Network Security Functions (I2NSF) analyzer and a security controller in an I2NSF system of a network functions virtualization (NFV) environment, and to overcome a weakness of not properly responding to problems found by monitoring a network security function (NSF) providing a security service.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

In order to achieve the above-described and other objects and needs, in one aspect of the present disclosure, there is provided a method of performing, by an Interface to Network Security Functions (I2NSF) analyzer, a security management in a security management system comprising receiving monitoring data from at least one network security function (NSF) providing a security service; analyzing the received monitoring data to generate a new security policy or feedback information; and providing the generated new security policy or feedback information to a security controller.

Receiving the monitoring data may comprise receiving the monitoring data collected from the NSF via a monitoring interface.

Receiving the monitoring data may comprise acquiring the monitoring data from the NSF using a query according to a request of the I2NSF analyzer, or acquiring the monitoring data using a report automatically transmitted by the NSF.

Generating the new security policy or the feedback information may comprise analyzing the received monitoring data using a machine learning; and generating the new security policy in which a security policy rule is reconfigured to solve a problem detected by a network based on a result of analysis. The new security policy may include at least one of a name or an address of the NSF; a problem detected by the NSF; and a solution to solve the problem.

Generating the new security policy or the feedback information may comprise acquiring the feedback information about a problem of the NSF for the security service based on the received monitoring data. The feedback information may include at least one of a name or an address of the NSF detecting the problem; a problem detected by the NSF; a solution to solve the problem; a time of delivery of the feedback information; and a language used for a text included in the solution.

Providing the new security policy or the feedback information to the security controller may comprise transmitting the generated new security policy or feedback information to the security controller via an analytics interface.

The new security policy transmitted to the security controller may be delivered to the NSF for providing the security service according to the new security policy via an NSF-facing interface.

The security controller may take an action to solve a reported problem by the feedback information transmitted to the security controller. The action may include a report to an I2NSF user and a query of a system resource management of a relevant NSF to a developer's management system (DMS).

The analytics interface may hold a list of security policies consisting of a list of rules to be enhanced on the NSF. A synchronization of the list of security policies may be performed between the I2NSF analyzer and the security controller.

In order to achieve the above-described and other objects and needs, in another aspect of the present disclosure, there is provided a security management system comprising an Interface to Network Security Functions (I2NSF) analyzer configured to perform a security management, wherein the I2NSF analyzer is further configured to receive monitoring data from at least one network security function (NSF) providing a security service, analyze the received monitoring data to generate a new security policy or feedback information, and provide the generated new security policy or feedback information to a security controller.

The I2NSF analyzer may be configured to receive the monitoring data collected from the NSF via a monitoring interface.

The I2NSF analyzer may be configured to acquire the monitoring data from the NSF using a query according to a request of the I2NSF analyzer, or acquire the monitoring data using a report automatically transmitted by the NSF.

The I2NSF analyzer may be configured to analyze the received monitoring data using a machine learning, generate the new security policy in which a security policy rule is reconfigured to solve a problem detected by a network based on a result of analysis, and transmit the generated new security policy or feedback information to the security controller via an analytics interface. The new security policy may include at least one of a name or an address of the NSF; a problem detected by the NSF; and a solution to solve the problem. The new security policy transmitted to the security controller may be delivered to the NSF for providing the security service according to the new security policy via an NSF-facing interface.

The I2NSF analyzer may be configured to acquire the feedback information about a problem of the NSF for the security service based on the received monitoring data and transmit the acquired feedback information to the security controller via an analytics interface. The feedback information may include at least one of a name or an address of the NSF detecting the problem; a problem detected by the NSF; a solution to solve the problem; a time of delivery of the feedback information; and a language used for a text included in the solution. The security controller may take an action to solve a reported problem by the feedback information transmitted to the security controller. The action may include a report to an I2NSF user and a query of a system resource management of a relevant NSF to a developer's management system (DMS).

Advantageous Effects

Embodiments of the present disclosure can define a YANG data model for an analytics interface between an I2NSF analyzer and a security controller in a security management system.

Embodiments of the present disclosure can timely provide, via an analytics interface, a security controller with a security policy or feedback information capable of coping with a problem found by monitoring an NSF providing a security service to thereby achieve an automated security management and to provide an improved security service through the NSF.

Effects that could be achieved with the present disclosure are not limited to those that have been described hereinabove merely by way of example, and other effects and advantages of the present disclosure will be more clearly understood from the following description by a person skilled in the art to which the present disclosure pertains.

BRIEF DESCRIPTION OF THE DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 7 illustrates a YANG tree structure for policy reconfiguration.

FIG. 10 illustrates a YANG tree structure for feedback information.

FIGS. 11A to 11M illustrate a YANG module of an analytics interface to which embodiments of the present disclosure are applicable.

FIG. 12 illustrates a DDoS attack scenario.

FIG. 13 illustrates a DDoS attack detected based on a scenario of FIG. 12.

FIG. 14 illustrates policy reconfiguration for detected DDoS attack of FIG. 13.

FIG. 15 illustrates monitoring data of an overloaded NSF based on a scenario of FIG. 12.

FIG. 16 illustrates feedback information for an overloaded NSF of FIG. 15.

DETAILED DESCRIPTION

Reference will now be made in detail to embodiments of the disclosure, examples of which are illustrated in the accompanying drawings. It will be noted that a detailed description of known arts will be omitted if it is determined that the detailed description of the known arts can obscure embodiments of the present disclosure. In addition, throughout the present disclosure, 'including' or 'comprising' any component does not exclude other components unless otherwise stated, but means that other components may be further included.

The terms used in the present disclosure are only used to describe specific embodiments or examples, and are not intended to limit the present disclosure. A singular expression can include a plural expression as long as it does not have an apparently different meaning in context. In the present disclosure, the terms "include" and "have" should be understood to be intended to designate that features, numbers, steps, operations, components, parts or combinations thereof exist and not to preclude the presence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary skill in the art to which the present disclosure pertains. The terms defined in a generally used dictionary can be understood to have meanings identical to those used in the context of a related art, and are not to be construed to have ideal or excessively formal meanings unless they are obviously specified in the present disclosure.

Recently, a fundamental standard interface for an Network Function Virtualization (NFV)-based security function has been developed by an Interface to Network Security Functions (I2NSF) working group. This is a part of the international internet standard organization called the Internet Engineering Task Force (IETF).

The object of the I2NSF is to define a standardized interface for heterogeneous network security function(s) (NSF) provided by multiple security solution vendors.

In an I2NSF architecture, without considering in detail the management of NSF(s) (the management of NSF eventually requires enforcement of a security policy), a user can define a protection policy for protecting network resources in a network system of the user. Further, a standardized interface to NSF(s) from multiple vendors can simplify configuration and managing of tasks for heterogeneous NSF(s).

Figure 1:
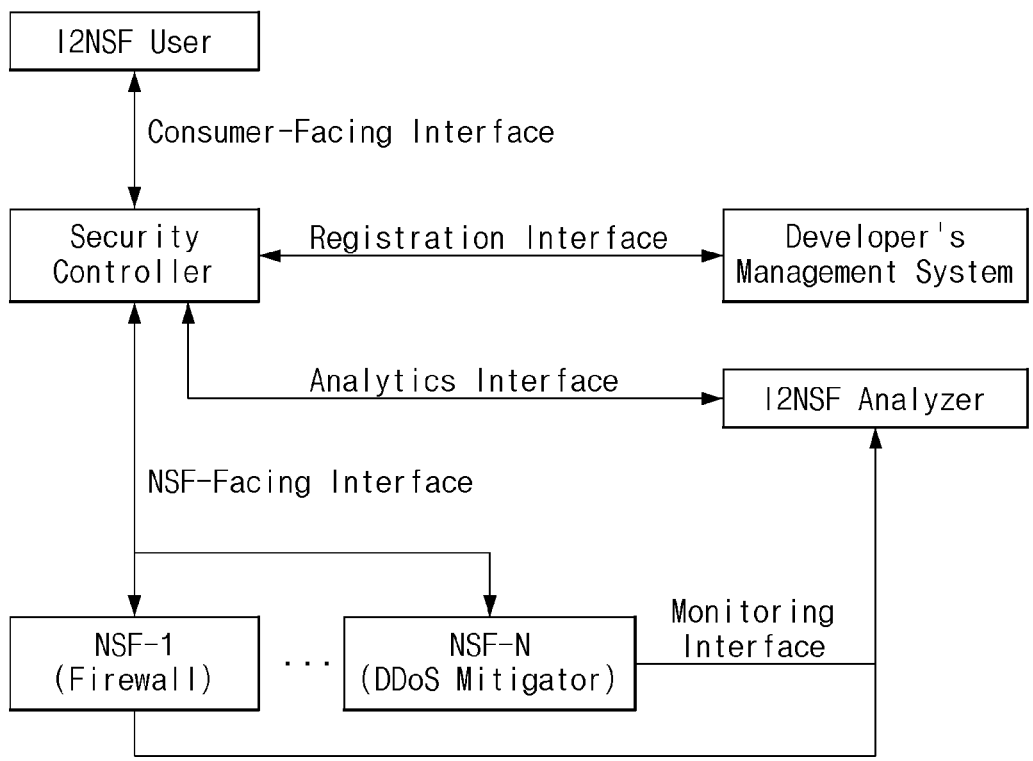
FIG. 1 illustrates an Interface to Network Security Functions (I2NSF) framework for security management automation (SMA) to which embodiments of the present disclosure are applicable.

FIG. 1 illustrates an I2NSF framework for security management automation (SMA) to which embodiments of the present disclosure are applicable.

In the interface for I2NSF, a monitoring interface is defined as an interface to collect monitoring data (e.g., network statistics and resources) from the NSF. The monitoring data may be received by a query or a report. In a query based method, the data may be acquired by a request of a client (e.g., an I2NSF analyzer). However, in a report-based approach, when either a notification or an alarm is triggered by an event, the data may be provided to the I2NSF analyzer by a server (e.g., NSF). In this model, the report-based approach may be used for an I2NSF system so as to implement security management automation (SMA) for a cloud-based security service. Thus, the monitoring data is automatically transmitted to the I2NSF analyzer from the NSF. FIG. 1 illustrates an I2NSF framework for security management automation.

Referring to FIG. 1, an I2NSF system may include an I2NSF user, a security controller, a developer's management system (DMS), an I2NSF analyzer, and/or at least one NSF.

The I2NSF user communicates with the security controller via a consumer-facing interface. The security controller communicates with the NSF(s) via an NSF-facing interface. The I2NSF analyzer communicates with the NSF(s) via the monitoring interface. The I2NSF analyzer also communicates with the security controller via an analytics interface. The developer's management system communicates with the security controller via a registration interface.

I2NSF User

The I2NSF user is an I2NSF component that requests information from another I2NSF component (e.g., the security controller) and/or uses a service (e.g., network security service) provided by another I2NSF component (e.g., the developer's management system). For example, the I2NSF user may include an overlay network management system, an enterprise network manager system, other network domain manager, etc.

An object performing functions assigned to the I2NSF user component may be referred to as an I2NSF consumer. Examples of the I2NSF consumer may include a video-conference network manager that needs to dynamically give a notice to an underlay network so as to allow, rate-limit, or reject a flow based on a specific field of a packet for a time span; enterprise network administrators and management systems that need to request a vendor network so as to enforce a specific I2NSF policy for a specific flow; and an IoT management system that transmits a request to an underlay network so as to block a flow matching a set of specific conditions.

The I2NSF user may create and distribute a high-level security policy. More specifically, the I2NSF user needs to use a network security service to protect a network traffic from various malicious attacks. In order to request the network security service, the I2NSF user may create the high-level security policy for a security service that the I2NSF user desires, and may inform a network operator management system of the high-level security policy.

In a process of preparing the high-level security policy, the I2NSF user may not consider types of NSF(s) required to implement a security service or a security policy rule configuration for the respective NSF(s).

Further, the I2NSF user may be notified security event(s) generated in the underlying NSF(s) by the network operator management system. By analyzing the security event(s) of the NSF(s), the I2NSF user may recognize a new attack and update (or create) the high-level security policy for coping with the new attack. As described above, the I2NSF user may define, manage, and monitor the security policy.

Security Controller

The security controller is a component that performs functions of collection and distribution point for providing security, monitoring, and other actions. The security controller may be managed by a network security manager and may also be referred to as the network operator management system or an I2NSF management system.

One of major functions of the security controller is to translate the high-level security policy (or policy rule) from the I2NSF user into a low-level security policy rule for specific NSF(s). The security controller (or the network operator management system) may receive the high-level security policy from the I2NSF user, and then determine types of NSF(s) required to enforce a policy requested first by the I2NSF user. Further, the security controller (or the network operator management system) may create the low-level security policy for each requested NSF(s). As a result, the security controller (or the network operator management system) may configure the generated low-level security policy to each NSF(s).

The security controller (or the network operator management system) may monitor the NSF(s) that is being driven in the system, and may maintain a variety of information (e.g., network access information, a workload state, etc.) about each NSF(s). Further, the security controller (or the network operator management system) may dynamically manage a pool of an NSF instance through dynamic lifecycle management of the NSF instance with the help of the developer's management system.

NSF

The NSF is a logical entity or a software component that provides a security-related service. For example, the NSF may receive the low-level security policy and may detect and block or attenuate a malicious network traffic based on the low-level security policy. Hence, integrity and confidentiality of a network communication stream can be secured.

Developer's Management System

The developer's management system is an I2NSF component that sends information to another I2NSF component (e.g., the I2NSF user, the security controller, etc.) and/or provides a service (e.g., the network security service). The developer's management system may be referred to as a vendor's management system. An object that performs a function assigned to the developer's management system may be referred to as an I2NSF producer.

The developer's management system may be managed by a third-party security vendor that provides the NSF(s) to the security controller. Multiple developer's management systems of various security vendors may exist.

I2NSF Analyzer

The I2NSF framework may need to update the existing security policy and create a new security policy based on a security attack on the NSF, a target network security attack, and performance and status of the NSF by monitoring the NSF(s) providing a security service in a cloud based environment. To this end, the I2NSF analyzer may receive and analyze monitoring data of the NSFs automatically delivered via the monitoring interface, and may produce a new security policy to further enhance the security of the network using the analyzed information.

The automatic reports of the monitoring data by the NSF are collected in a single instance (i.e., the I2NSF analyzer) to analyze them. The I2NSF analyzer can monitor the monitoring data to create the new security policy and further enhance the security of the network. In order to create a more accurate and efficient automated system, the analysis of the monitoring data should be performed automatically with the help of machine learning.

The new security policy needs to be delivered from the I2NSF analyzer to the security controller, so the new security policy can be listed and monitored properly. That is, feedback information for creating the new security policy or updating the existing security policy should be provided to the security controller from the I2NSF analyzer, so an analytics interface is introduced as an intermediary interface between the I2NSF analyzer and the security controller. Then, the new policy should be delivered directly to the appropriate NSF by the security controller via an NSF-facing interface.

Analytics Interface

If the I2NSF analyzer updates the existing security policy or creates the new security policy, an interface is necessary to provide this to the security controller.

The present disclosure is to provide a standard for a feedback interface in the I2NSF framework called an analytics interface and to achieve security management automation (SMA) via the provided analytics interface.

The present disclosure describes an information model and a YANG data model for the analytics interface between the I2NSF analyzer and the security controller in the I2NSF system in a network functions virtualization (NFV) environment. The YANG data model may be based on the I2NSF NSF-facing interface and the I2NSF monitoring interface for enabling the delivery of analytics information based on the monitoring data received from the NSF.

Consumer-Facing Interface (CFI)

The CFI is an interface to the I2NSF system of the user, positioned between the I2NSF user and the security controller. By being designed in this way, only an abstract view of the NSF(s) is provided to the user with the details of underlying NSF(s) hidden.

The CFI may be used to enable different users of a given I2NSF system to define, manage, and monitor a security policy for a specific flow in a management domain. The high-level security policy (or policy rule) created by the I2NSF user may be delivered to the network operator management system via the CFI.

NSF-Facing Interface (NFI)

The NFI is an interface positioned between the security controller (or the network operator management system) and the NSF(s).

The NFI may be used to designate and monitor a flow-based security policy enforced by one or more NSFs. For example, the I2NSF system may use a flow-based NSF. The flow-based NSF is an NSF that examines a network flow based on a set of policies to enhance security characteristics. Flow-based security by the flow-based NSF means that packets are examined in the order they are received, and there is no correction for the packets based on an examination process. An interface for the flow-based NSF may be classified as follows:

NSF Operational and Administrative Interface): This indicates an interface group used by the I2NSF management system to program an operation state of the NSF. The interface group also includes a management control capability. The I2NSF policy rule indicates one method of changing the interface group in a consistent manner Since an application and an I2NSF component need to dynamically control the actions of traffics that they transmit and receive, most of I2NSF efforts are related to the interface group.

Monitoring Interface: This indicates an interface group used by the I2NSF management system to acquire monitoring data from one or more selected NSFs. Each interface of the interface group may be a query- or report-based interface. A difference between the two is that the query-based interface is used by the I2NSF management system to obtain information, but the report-based interface is used by the NSF to provide information. The capability of the interface group may also be defined by another protocol such as SYSLOG [RFC5424] and DOTS (DDoS Open Threat Signaling) [RFC8612]. The I2NSF management system may take one or more actions based on the reception of information. This should be designated by an I2NSF policy rule. The interface group does not change the operation state of the NSF.

As described above, the NFI may be developed using a flow-based paradigm. A common trait of the flow-based NSF is to process a packet based on the contents (e.g., header/payload) and/or context (e.g., session state and authentication state) of a received packet. This trait is one of requirements for defining the action of the I2NSF system.

The I2NSF management system does not need to use all capabilities of a given NSF and does not need to use all the available NSFs. Accordingly, this abstraction enables an NSF feature to be handled as a building block by an NSF system. Therefore, a developer can freely use a security capability defined by an individual NSF for a vendor and a technology.

Registration Interface (RI)

The RI is an interface positioned between the security controller and the developer's management system. The NSFs provided by different vendors may have different capabilities. Thus, in order to automate a process that uses various types of security capabilities provided by different vendors, the vendors need to have a dedicated interface for determining the capabilities of their NSFs. The dedicated interface may be referred to as I2NSF registration interface (RI).

The capability of the NSF may be pre-configured or may be dynamically searched via the I2NSF RI. If a new capability exposed to a consumer is added to the NSF, the new capability needs to be registered on an I2NSF registry via the I2NSF RI so that an interested management and control entity can know the capability.

Figure 2:
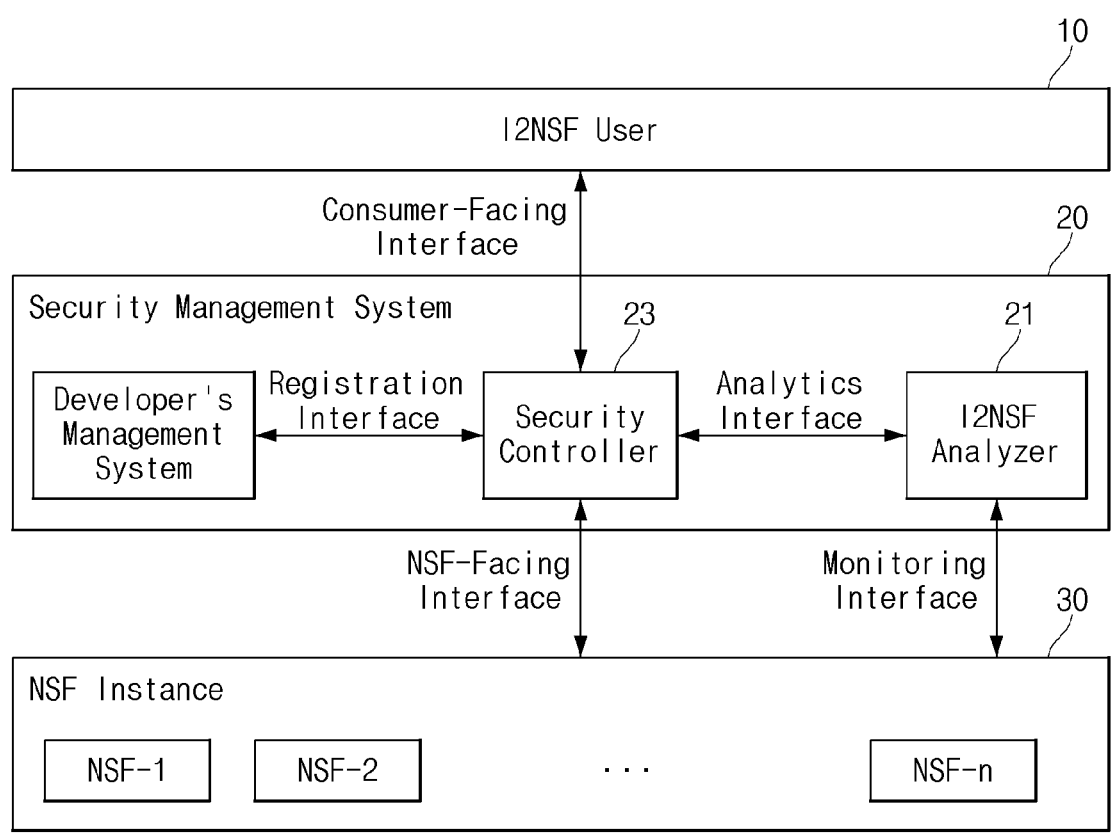
FIG. 2 illustrates an architecture of an I2NSF system according to an embodiment of the present disclosure.

FIG. 2 illustrates an architecture of an I2NSF system according to an embodiment of the present disclosure. The system has been implemented based on the I2NSF framework described above. Accordingly, each configuration is described focusing on actions and functions of an I2NSF analyzer 21 and a security controller 23 performing the security management. The description of FIG. 2 overlapping the description of FIG. 1 is omitted.

Referring to FIG. 2, an I2NSF system includes an I2NSF user 10 layer, a security management system 20 layer, and an NSF instance 30 layer. The security management system 20 layer includes the I2NSF analyzer 21, the security controller 23, and a developer's management system.

The I2NSF user 10 layer communicates with the security management system 20 layer via a consumer-facing interface. For example, the I2NSF user 10 layer communicates with the security controller 23 of the security management system 20 layer via the consumer-facing interface. The security management system 20 layer communicates with the NSF instance 30 layer via an NSF-facing interface. For example, the security controller 23 of the security management system 20 layer communicates with NSF instance(s) of the NSF instance 30 layer via the NSF-facing interface. The developer's management system of the security management system 20 layer communicates with the security controller 23 of the security management system 20 layer via a registration interface.

The I2NSF user 10 layer, the security controller 23 component of the security management system 20 layer, the developer's management system component of the security management system 20 layer, and the NSF instance 30 layer illustrated in FIG. 2 respectively correspond to the I2NSF user component, the security controller component, the developer's management system component, and the NSF component illustrated in FIG. 1. Further, the consumer-facing interface, the NSF-facing interface, and the registration interface illustrated in FIG. 2 respectively correspond to the consumer-facing interface, the NSF-facing interface, and the registration interface illustrated in FIG. 1.

Security Management System

The security controller 23 of the security management system 20 layer may include two components such as a security policy manager and an NSF capability manager.

The security policy manager (not shown) may receive a high-level policy from a policy updater via the CFI, and the high-level policy may be mapped to several low-level policies. The low-level policies are related to a given NSF capability registered in an NSF capability manager. Further, the security policy manager may deliver the policy to NSF(s) via the NFI.

The NSF capability manager (not shown) may designate a capability of the NSF registered by the developer's management system and share the capability with the security policy manager so as to create a low-level policy related to a given NSF capability. Each time a new NSF is registered, the NSF capability manager may request the developer's management system to register the capability of the NSF in a management table of the NSF capability manager via the registration interface. The developer's management system corresponds to another part of the security management system 20 for registering a capability of a new NSF to the NSF capability manager.

Referring to FIG. 2, the I2NSF analyzer 21 may analyze monitoring data of NSF(s) collected via a monitoring interface through machine learning, find timely a security attack for the NSF or a target network and problems of hardware or system of the NSF, and provide the security controller 23 with policy reconfiguration or feedback information capable of coping with the security attack and the problems of the NSF via an analytics Interface.

Then, the security controller 23 takes actions to deal with the detected problem based on the delivered policy reconfiguration or feedback information. For the policy reconfiguration, the security controller 23 induces the NSF to provide an improved security service by delivering a security policy rule to the NSF for providing a security service according to a new security policy. For the feedback information, the security controller 23 may take an action to solve problem(s) reported by the feedback information.

NSF Instances

As illustrated in FIG. 2, the NSF instance 30 layer includes NSFs. In this instance, all the NSFs are positioned at the NSF instance layer. After a high-level policy is mapped to a low-level policy, the security controller (more specifically, the security policy manager) delivers the policy to the NSF(s) via the NFI. In this case, the NSF may detect and block or attenuate a malicious network traffic based on the received low-level security policy.

For the rapid development of a virtualization system, a high-level security capability is required for various scenarios (for example, a network device of an enterprise network, a user equipment of a mobile network, a device of the internet, or a resident access device, etc.). NSFs produced by several security companies may provide customers with various security capabilities. That is, regardless of whether the NSFs have been implemented by a physical or virtual capability, several NSFs may be combined with each other to provide a security service for a given network traffic. The security capability refers to a capability related to security of a series of networks that can be used for the purpose of enforcing a security policy. The security capability is independent from an actually implemented security control mechanism, and a set of capabilities that can be provided by the NSFs is registered in all the NSFs. The security capability is a market leader providing a method that can define a customized security protection by clearly explaining the security capability provided by a specific NSF. Further, the company supplying the security capability may be described in a neutral manner based on the security capability. That is, it is not required to state a specific product when designing a network, and a feature may be considered for each capability.

As described above, the I2NSF interface that can be used for providing the security policy may have the following two types.

An interface and a security controller between an I2NSF user and an application program (consumer-facing interface): a service-directional interface providing NSF data and a communication channel between a service user and a network operator management system (or security controller).

The I2NSF consumer-facing interface enables security information to be used for exchange between various applications (e.g., OpenStack or various business support system (BSS)/operations support system (OSS) components) and the security controller. A design goal of the I2NSF consumer-facing interface is to implement and separate specs of the security service.

An interface (e.g., firewall, intrusion prevention or antivirus) and a security controller between NSFs (NSF-facing interface): the NSF-facing interface is used to separate a security management system from a set of NSFs in several implementations and is independent in a way of implementing the NSF (e.g., a virtual machine or actual appliances, etc.).

Figure 3:
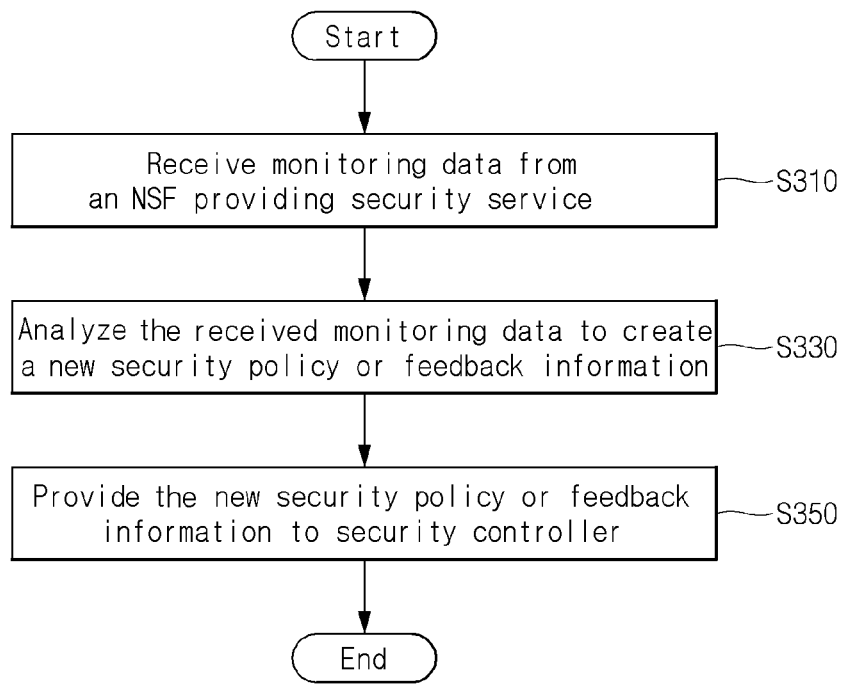
FIG. 3 is a flow chart illustrating a method of performing, by an I2NSF analyzer, a security management in a security management system to which embodiments of the present disclosure are applicable.

FIG. 3 is a flow chart illustrating a method of performing, by an I2NSF analyzer, security management in a security management system to which embodiments of the present disclosure are applicable.

In a step S310, an I2NSF analyzer receives monitoring data from at least one NSF providing a security service. In this instance, the I2NSF analyzer may receive the monitoring data collected from the NSF via a monitoring interface. A process of receiving the monitoring data may be achieved by acquiring the monitoring data from the NSF using a query according to a request of the I2NSF analyzer, or acquiring the monitoring data using a report automatically transmitted by the NSF.

In a step S330, the I2NSF analyzer analyzes the monitoring data received through the step S310 to generate a new security policy or feedback information. The I2NSF analyzer may roughly generate two types of information, and a detailed operation will be described later with reference to the drawings.

In a step S350, the I2NSF analyzer provides a security controller with the new security policy or the feedback information generated through the step S330. Embodiments of the present disclosure propose an analytics interface as an interface to deliver a report for augmentation or generation of a security policy rule created by the I2NSF analyzer to the security controller. The security controller can actively reinforce a network by performing a security policy management using the analytics interface. To this end, the analytics interface holds a list of security policies each consisting of a list of rules to be enhanced on the NSF, and the synchronization of the list of security policies may be performed between the I2NSF analyzer and the security controller. A detailed processing process of the security controller based on two types of the delivered information will be described later with reference to the drawings.

Figure 4:
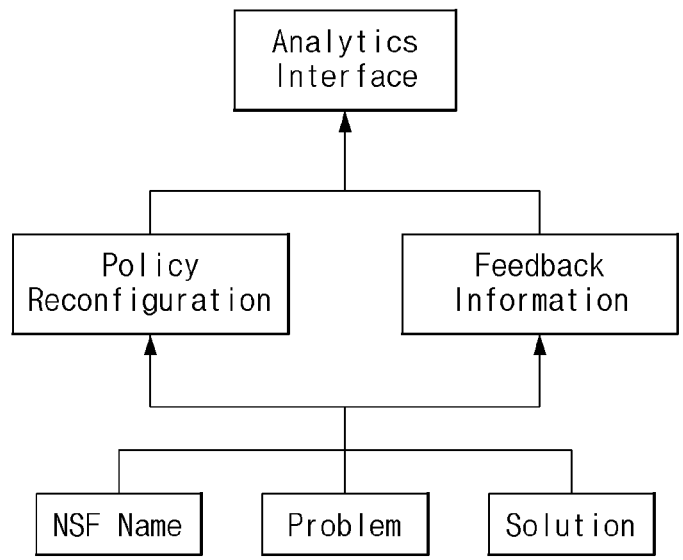
FIG. 4 illustrates an information model of an analytics interface to which embodiments of the present disclosure are applicable.

FIG. 4 illustrates an information model of an analytics interface to which embodiments of the present disclosure are applicable. More specifically, FIG. 4 illustrates a high-level concept of the analytics interface for delivering analytics information (i.e., policy reconfiguration and feedback information) to the security controller. Both the policy reconfiguration and the feedback information provide the following high-level abstraction.

NSF Name: It is the name or IP address of the NSF for identifying the NSF with problem. The name may be a unique string to identify an NSF, including a fully qualified domain name (FQDN).

Problem: It describes issue(s) in the NSF that needs to be handled.

Solution: It specifies the possible solution(s) for the problem.

Information Model for Policy Reconfiguration

The policy reconfiguration rearranges a security policy in a different form or combination of the existing security policy to enhance the security service in the network. The policy reconfiguration is generated by the I2NSF analyzer after receiving and analyzing monitoring data of NSF events from an NSF.

The policy reconfiguration may work together with the three I2NSF interfaces (i.e., NSF-facing interface, NSF monitoring interface, and analytics interface) defined for the I2NSF framework to create a closed-loop security system for reinforcing the network security.

Figure 5:
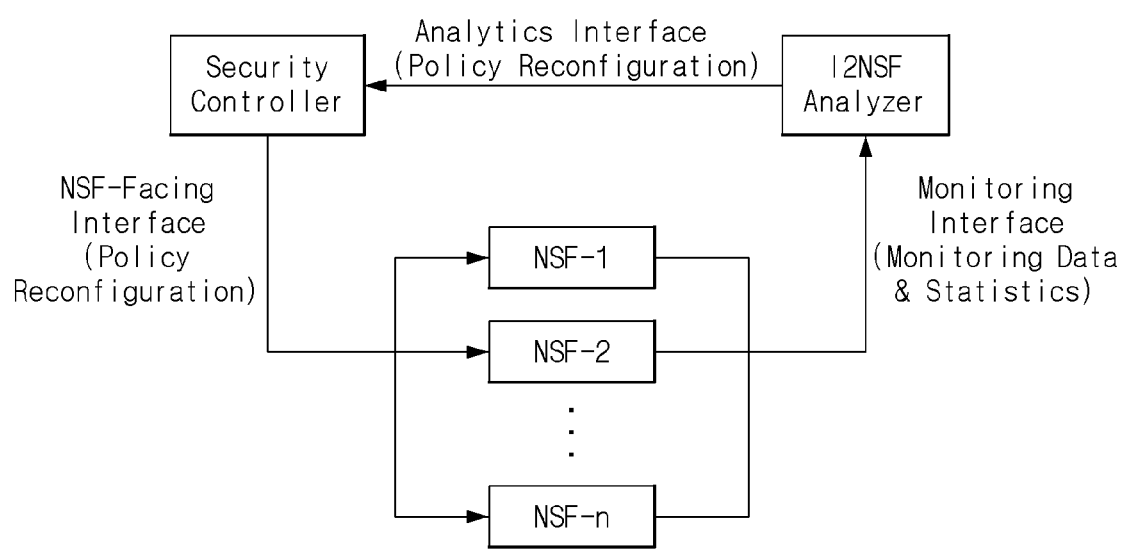
FIG. 5 illustrates a closed-loop security system for security management automation according to an embodiment of the present disclosure.

FIG. 5 illustrates a closed-loop security system for an I2NSF framework for security management automation according to an embodiment of the present disclosure. More specifically, FIG. 5 illustrates a closed-loop security system between a security controller, an NSF, and an I2NSF analyzer.

The security controller delivers a security policy to an appropriate NSF via the NSF-facing interface. The NSF prepares for a security service according to the given configuration and provides a security service for the network. The NSF should also provide monitoring data (e.g., NSF events and system alarms) to be analyzed. This monitoring data may be delivered to the I2NSF analyzer by the NSF via the monitoring interface. Then the I2NSF analyzer analyzes the monitoring data for the reconfiguration of an existing security policy, the generation of a new security policy, and the feedback for security system management (e.g., the scaling-up or scaling-down of resources related to NSFs). To fully automate the closed-loop security system, the I2NSF analyzer should automatically analyze the monitoring data using machine learning techniques (e.g., deep learning). A result of the analysis may trigger the reconfiguration of an existing security policy or the generation of a new security policy to strengthen the network security. The reconfiguration or the configuration request is delivered by the I2NSF analyzer to the security controller via the analytics interface.

To realize the closed-loop security system, the analytics interface needs to properly follow the similar guidelines for the I2NSF framework. The analytics interface may create a security policy to reconfigure an existing security policy of NSF(s) or to generate a new security policy with reference to the NSF-facing interface.

The analytics interface may hold a list of security policies so that the (re)configuration of a security policy and the feedback information can be provided to the security controller. Each policy consists of a list of rule(s) to be enhanced on the NSF. The synchronization of the list of security policies should be done between the security controller and the I2NSF analyzer. A (re)configured security policy rule should be able to cope with attacks or failures that may happen to the network in near future. Such a rule may be reconfigured or generated by the I2NSF analyzer to tackle a detected problem in the network. It may use an event-condition-action (ECA) model as the basis for the design of I2NSF policy (re)configuration as described in the I2NSF capability data model.

An example of policy (re)configuration is a DDoS attack that is detected by a DDoS mitigator. The DDoS mitigator creates monitoring data and delivers the monitoring data to the I2NSF analyzer. The I2NSF analyzer may analyze the monitoring data and generate a new policy to handle the DDoS attack, such as a firewall rule to drop all packets from the source of the DDoS attack.

Figure 6:
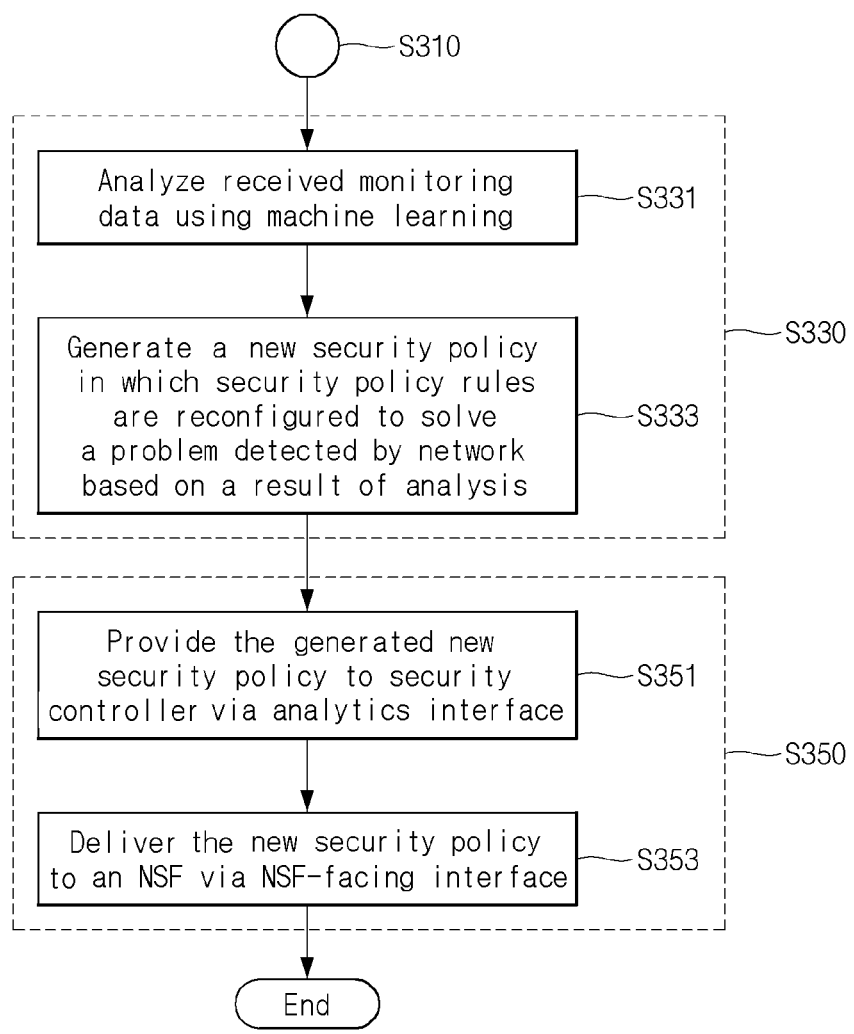
FIG. 6 is a flow chart illustrating in more detail a method of FIG. 3 of performing a security management in a security management system according to an embodiment of the present disclosure, focusing on policy reconfiguration.

FIG. 6 is a flow chart illustrating in more detail a method of FIG. 3 of performing security management in a security management system according to an embodiment of the present disclosure, focusing on policy reconfiguration. The method of FIG. 6 is described focusing on the step S330 of creating the new security policy or the feedback information and the step S350 of providing it to the security controller.

In the step S330, the I2NSF analyzer may analyze the monitoring data received via the monitoring interface using machine learning in S331, and generate a new security policy in which security policy rules are reconfigured to solve the problem detected by the network based on a result of analysis in S333.

In the step S350, the I2NSF analyzer may transmit the above generated new security policy to the security controller via the analytics interface, in S351. Then, the new security policy transmitted to the security controller may be delivered to an NSF for providing a security service according to the new security policy via the NSF-facing interface, in S353.

FIG. 7 illustrates a YANG tree structure for policy reconfiguration. The YANG tree structure may be provided through the augmentation of an NSF-facing interface YANG module. The policy reconfiguration should include the following information.

NSF Name: The name or IP address (IPv4 or IPv6) of the NSF to be configured. If the given nsf-name is not IP address, the name may be an arbitrary string including a fully qualified domain name (FQDN).

Problem: The issue that is detected by an NSF via the I2NSF monitoring interface. The problem for policy configuration may include NSF events described in an NSF monitoring interface YANG data model, such as DDoS detection, virus detection, intrusion detection, Web-attack detection, and Voice over Internet Protocol (VoIP) or Voice over Cellular Network (VoCN) violation detection.

Solution: The solution for policy (re)configuration is the security policy that is reconfigured or generated to solve a detected attack. The security policy can be configured using the NSF-facing interface YANG data model.

In summary, the new security policy generated through the policy reconfiguration according to the present embodiment may include at least one of the name or the address of the NSF, the problem detected by the NSF, and the solution to solve the problem.

Information Model for Feedback Information

The feedback information is information about problem(s) of an NSF for a security service such as either over-usage or malfunction of a system resource. This problem cannot be handled by creating a new policy. In the similar way to the policy reconfiguration, the feedback information should be delivered by the I2NSF analyzer to the security controller that will be able to handle the reported problem(s).

Figure 8:
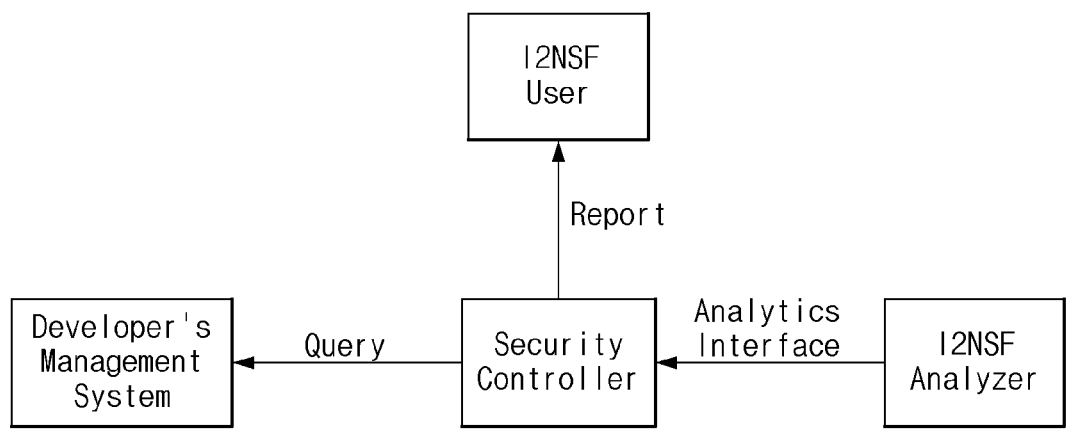
FIG. 8 illustrates processing of feedback information in a security management system according to an embodiment of the present disclosure.

FIG. 8 illustrates processing of feedback information in a security management system according to an embodiment of the present disclosure. For the feedback information, since the given feedback is not a security policy, the security controller needs to take an action to handle the reported problem(s). The action may include a report to the I2NSF user and a query of the system resource management of the relevant NSF(s) to the developer's management system (DMS). The developer's management system may communicate with a management and orchestration (MANO) unit in the network functions virtualization (NFV) framework to deal with the system management issue(s) of the relevant NSF(s).

Figure 9:
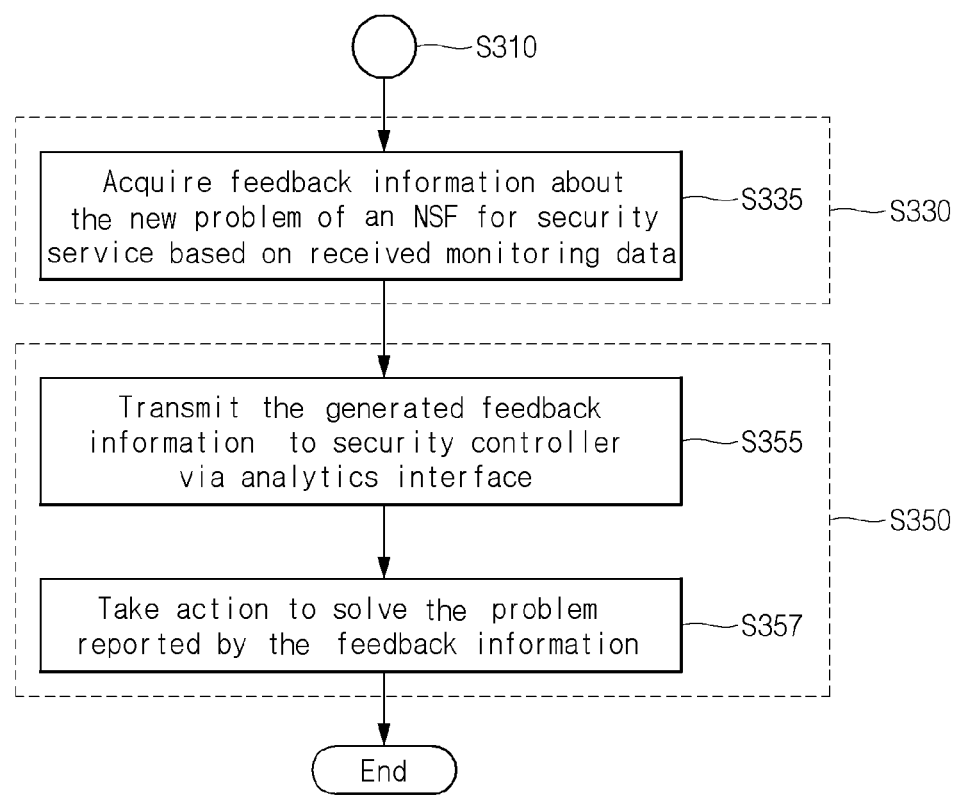
FIG. 9 is a flow chart illustrating in more detail a method of FIG. 3 of performing a security management in a security management system according to an embodiment of the present disclosure, focusing on feedback information.

FIG. 9 is a flow chart illustrating in more detail a method of FIG. 3 of performing security management in a security management system according to an embodiment of the present disclosure, focusing on feedback information. The method of FIG. 9 is described focusing on the step S330 of creating the new security policy or the feedback information and the step S350 of providing it to the security controller.

In the step S330, the I2NSF analyzer may acquire feedback information about the problem(s) of the NSF for a security service based on the monitoring data received via the monitoring interface, in S335.

In the step S350, the I2NSF analyzer may transmit the feedback information to the security controller via the analytics interface, in S355. Then, the security controller may take an action to solve the reported problem(s) by the feedback information transmitted to the security controller, in S357. The action may include a report to the I2NSF user and a query of the system resource management of the relevant NSF(s) to the developer's management system (DMS).

FIG. 10 illustrates a YANG tree structure for feedback information. The YANG tree structure may be provided using an NSF monitoring interface YANG module. More specifically, FIG. 10 illustrates high-level abstraction of feedback information, and the feedback information should include the following.

NSF: The name or IP address (IPv4 or IPv6) of the NSF that detects the problem. If the given nsf-name is not IP address, the name may be an arbitrary string including a fully qualified domain name (FQDN).

Time: The time of the delivery of the feedback information.

Language: The language tag that is used for the natural language text that is included in the "message" and "solution" attributes. The language field may be encoded based on specific rules.

Problem: The issue that is detected by an NSF via the I2NSF monitoring interface. The problem for the feedback information may include a system alarm described in the NSF monitoring interface YANG data model, such as a memory alarm, a CPU alarm, a disk alarm, a hardware alarm, and an interface alarm.

Solution: A possible solution given as feedback may be in the form of a free-form string (e.g., a high-level instruction).

In summary, the feedback information according to the present embodiment may include at least one of the name or the address of the NSF detecting the problem, the problem detected by the NSF, the solution to solve the problem, the time of the delivery of the feedback information, and language used for the text that is included in the solution.

YANG Data Model of Analytics Interface

FIGS. 11A to 11M illustrate a YANG module of an analytics interface to which embodiments of the present disclosure are applicable. Referring to FIGS. 11A to 11M, a security management system may define a YANG data model for an analytics interface between an Interface to Network Security Functions (I2NSF) analyzer and a security controller.

The detailed methods of performing the security management by the I2NSF analyzer in the security management system have been described above. A series of processing processes are described as follows in terms of device configuration with reference to the architecture of the I2NSF system illustrated in FIG. 2.

The security management system includes the I2NSF analyzer performing the security management. In this instance, the I2NSF analyzer receives monitoring data from at least one network security function (NSF) providing a security service, analyzes the received monitoring data to generate a new security policy or feedback information, and provides the generated new security policy or feedback information to the security controller.

The I2NSF analyzer may receive the monitoring data collected from the NSF via a monitoring interface. The I2NSF analyzer may acquire the monitoring data from the NSF using a query according to a request of the I2NSF analyzer, or acquire the monitoring data using a report automatically transmitted by the NSF.

For example, the I2NSF analyzer may analyze the received monitoring data using machine learning, generate a new security policy in which security policy rules are reconfigured to solve a problem detected by a network based on a result of analysis, and transmit the above generated new security policy to the security controller via an analytics interface. Then, the new security policy transmitted to the security controller may be delivered to an NSF for providing a security service according to the new security policy via an NSF-facing interface.

As another example, the I2NSF analyzer may acquire feedback information about a problem of an NSF for a security service based on the received monitoring data, and transmit the acquired feedback information to the security controller via the analytics interface. Then, an action to solve the problem reported by the security controller may be performed by the feedback information transmitted to the security controller. The action may include a report to the I2NSF user and a query of the system resource management of the relevant NSF to the developer's management system (DMS).

XML Configuration Examples of Analytics Information

The following introduces XML configuration examples of analytics information including feedback policy rules, which is delivered by the I2NSF analyzer to the security controller over the analytics interface after the I2NSF analyzer analyzes monitoring data.

(1) Feedback Policy for DDoS Detection

FIG. 12 illustrates a DDoS attack scenario. FIG. 13 illustrates a DDoS attack detected based on the scenario of FIG. 12. In the scenario, a DDoS mitigator may detect a DDoS attack and send a notification to the I2NSF analyzer as illustrated in FIG. 13.

In the scenario illustrated in FIG. 13, the XML examples are described as follows.

1. The DDoS attack was detected at 9 am on Aug. 27, 2021.
2. The sources of the attack are 192.0.2.8, 192.0.2.9, and 192.0.2.10.
3. The destination of the attack is 203.0.113.0/24.

After receiving the monitoring data, the I2NSF analyzer may analyze the monitoring data and create a new feedback policy to enforce the security of the network. FIG. 14 illustrates policy reconfiguration for the detected DDoS attack of FIG. 13. The I2NSF analyzer may deliver the feedback policy to the security controller as illustrated in FIG. 14.

The policy reconfiguration in FIG. 14 indicates the following.

1. The feedback policy is named as "feedback_policy_for_ddos_attack".
2. The rule is named as "deny_ddos_attack".
3. The rule starts from 09:00 am on Aug. 24, 2021. The condition of the rule is from the sources of the IP addresses of 192.0.2.8, 192.0.2.9, and 192.0.2.10.
4. The action required is to "drop" any access from the IP addresses that have been identified as malicious.
5. The NSF to be configured is named "Firewall".
6. The problem that triggered the generation of the feedback is a DDoS attack from the sources of the IP addresses of 192.0.2.8, 192.0.2.9, and 192.0.2.10 to the protected network of 203.0.113.0/24.

(2) Feedback Information for Overloaded NSF

FIG. 15 illustrates monitoring data of an overloaded NSF based on the scenario of FIG. 12. In the scenario, the NSF may be overloaded and may send a notification to the I2NSF analyzer as illustrated in FIG. 15.

In the scenario illustrated in FIG. 15, the XML examples are described as follows.

1. The NSF that sends the monitoring data is named "firewall".
2. The memory usage of the NSF triggered the alarm.
3. The memory usage of the NSF is 98%.
4. The memory threshold to trigger the alarm is 80%.
5. The event is delivered at 2021-08-27T07:43:52.181088+00:00.

After receiving the monitoring data, the I2NSF analyzer analyzes the monitoring data and creates a new feedback policy to solve the problem that is detected by the NSF. FIG. 16 illustrates feedback information for an overloaded NSF of FIG. 15. The I2NSF analyzer may deliver the feedback information to the security controller as illustrated in FIG. 16.

The feedback information of FIG. 16 indicates the following.

1. The name of the NSF that needs to be handled is called "Firewall".
2. The feedback information is delivered at 2021-08-27T08:43:52.000000+00:00.
3. The problem is that the memory usage exceeded the threshold with the average usage of memory as 95.
4. The problem persists for 3,600 seconds (1 hour) without any fix.
5. The proposed solution to the problem is either to add more memory capacity in hardware to the NSF or to create a new NSF with the same security service.

The YANG module specified in the present disclosure defines a data schema designed to be accessed through network management protocols such as NETCONF [RFC6241] or RESTCONF [RFC8040]. The lowest NETCONF layer is the secure transport layer, and the required secure transport is secure shell (SSH) [RFC6242]. The lowest RESTCONF layer is HTTPS, and the required secure transport is TLS [RFC8446].

The NETCONF access control model [RFC8341] provides a means of restricting access to specific NETCONF or RESTCONF users to a preconfigured subset of all available NETCONF or RESTCONF protocol operations and contents.

The embodiments of the present disclosure can define a YANG data model for the analytics interface between the I2NSF analyzer and the security controller in the security management system, and can timely provide, via the analytics interface, the security controller with the security policy or the feedback information capable of coping with the problem found by monitoring the NSF providing the security service to thereby achieve the automated security management and to provide the improved security service through the NSF.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like. When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

Embodiments of the present disclosure can be implemented as computer-readable codes on a computer-readable recording medium. The computer-readable recording medium includes all types of recording devices in which data readable by a computer system is stored. Examples of the computer-readable recording medium include a ROM, a RAM, a CD-ROM, a magnetic tape, a floppy disk, an optical data storage device, etc. Further, the computer-readable recording medium may be distributed to computer systems connected over a network, and computer-readable codes may be stored and executed in a distributed manner Functional programs, codes, and code segments for implementing the embodiments can be easily construed by programmers skilled in the art to which the present disclosure pertains.

Hereinabove, the present disclosure has been described with reference to various embodiments. It can be understood by those skilled in the art to which the present disclosure pertains that various modification examples may be made by the configurations and methods described and illustrated herein without departing from the scope of the present disclosure. Therefore, embodiments disclosed herein should be considered in an illustrative aspect rather than a restrictive aspect. Further, the scope of the present disclosure is not limited by the above-described embodiments and should be defined only in accordance with the accompanying claims and their equivalents.

INDUSTRIAL APPLICABILITY

Embodiments of the present disclosure can be applied to various security management systems.

DETAILED DESCRIPTION OF MAIN ELEMENTS

| | |
|---|---|
| 10: I2NSF USER | |
| 20: SECURITY MANAGEMENT SYSTEM | |
| 21: I2NSF ANALYZER | 23: SECURITY CONTROLLER |
| 30: NSF INSTANCE | |

The invention claimed is:

1. A method of performing, by an Interface to Network Security Functions (I2NSF) analyzer, a security management in a security management system, the method comprising:
   receiving monitoring data from a network security function (NSF) providing a security service;
   analyzing the received monitoring data to generate feedback information and new security policy; and
   providing the generated new security policy and the generated feedback information to a security controller,
   wherein generating the feedback information comprises:
   acquiring the feedback information about a problem of the NSF for the security service based on the received monitoring data,
   wherein the feedback information includes:
   at least one of a name or an address of the NSF detecting the problem;
   the problem detected by the NSF;
   a solution to solve the problem;
   a time of delivery of the feedback information; and
   a language used for a text included in the solution.

2. The method of claim 1, wherein receiving the monitoring data comprises:
   receiving the monitoring data collected from the NSF via a monitoring interface.

3. The method of claim 1, wherein receiving the monitoring data comprises:
   acquiring the monitoring data from the NSF using a query according to a request of the I2NSF analyzer, or
   acquiring the monitoring data using a report automatically transmitted by the NSF.

4. The method of claim 1, wherein providing the feedback information to the security controller comprises:
   transmitting the generated feedback information to the security controller via an analytics interface that comprises a YANG module.

5. The method of claim 4, wherein the security controller takes an action to solve a reported problem by the feedback information transmitted to the security controller, and
   wherein the action includes a report to an I2NSF user and a query of a system resource management of a relevant NSF to a developer's management system (DMS).

6. A security management system comprising:
   an Interface to Network Security Functions (I2NSF) analyzer including a Virtualized Computing System and implemented by one or more hardware processors and configured to perform a security management,
   wherein the I2NSF analyzer is further configured to:
   receive monitoring data from a network security function (NSF) providing a security service;
   analyze the received monitoring data to generate a new security policy and feedback information; and
   provide the generated new security policy and feedback information to a security controller,
   wherein for generating the feedback information, the I2NSF analyzer is further configured to:
   acquire the feedback information about a problem of the NSF for the security service based on the received monitoring data,
   wherein the feedback information includes:
   at least one of a name or an address of the NSF detecting the problem;
   the problem detected by the NSF;
   a solution to solve the problem;
   a time of delivery of the feedback information; and a language used for a text included in the solution.

7. The security management system of claim 6, wherein the I2NSF analyzer is configured to receive the monitoring data collected from the NSF via a monitoring interface.

8. The security management system of claim 7, wherein the I2NSF analyzer is configured to:
   acquire the monitoring data from the NSF using a query according to a request of the I2NSF analyzer, or
   acquire the monitoring data using a report automatically transmitted by the NSF.

9. The security management system of claim 6, wherein the I2NSF analyzer is configured to:
   analyze the received monitoring data using a machine learning;
   generate the new security policy in which a security policy rule is reconfigured to solve a problem detected by a network based on a result of the analyzing using the machine learning; and
   transmit the generated new security policy or feedback information to the security controller via an analytics interface.

10. The security management system of claim 9, wherein the new security policy includes:
    at least one of a name or an address of the NSF;
    a problem detected by the NSF; and
    a solution to solve the problem.

11. The security management system of claim 9, wherein the new security policy transmitted to the security controller is delivered to the NSF for providing the security service according to the new security policy via an NSF-facing interface.

12. The security management system of claim 6, wherein the security controller takes an action to solve a reported problem by the feedback information transmitted to the security controller, and
    wherein the action includes a report to an I2NSF user and a query of a system resource management of a relevant NSF to a developer's management system (DMS).

13. A method of performing, by an Interface to Network Security Functions (I2NSF) analyzer, a security management in a security management system, the method comprising:
    receiving monitoring data from a network security function (NSF) providing a security service;
    analyzing the received monitoring data to generate a new security policy; and
    providing the generated new security policy to a security controller via an analytics interface that comprises a YANG module,
    wherein the analytics interface holds a list of security policies consisting of a list of rules to be enhanced on the NSF, and
    wherein a synchronization of the list of security policies is performed between the I2NSF analyzer and the security controller.

14. The method of claim 13, wherein generating the new security policy comprises:
    analyzing the received monitoring data using a machine learning; and
    generating the new security policy in which a security policy rule is reconfigured to solve a problem detected by a network based on a result of the analyzing using the machine learning.

15. The method of claim 14, wherein the new security policy includes:
    at least one of a name or an address of the NSF;
    a problem detected by the NSF; and
    a solution to solve the problem.

16. The method of claim 13, wherein the new security policy provided to the security controller is delivered to the NSF for providing the security service according to the new security policy via an NSF-facing interface.

\* \* \* \* \*